May 14, 1940.  C. F. LOZON  2,200,577
PRODUCTION OF CHARGED CAPSULES
Filed March 18, 1938  2 Sheets-Sheet 1
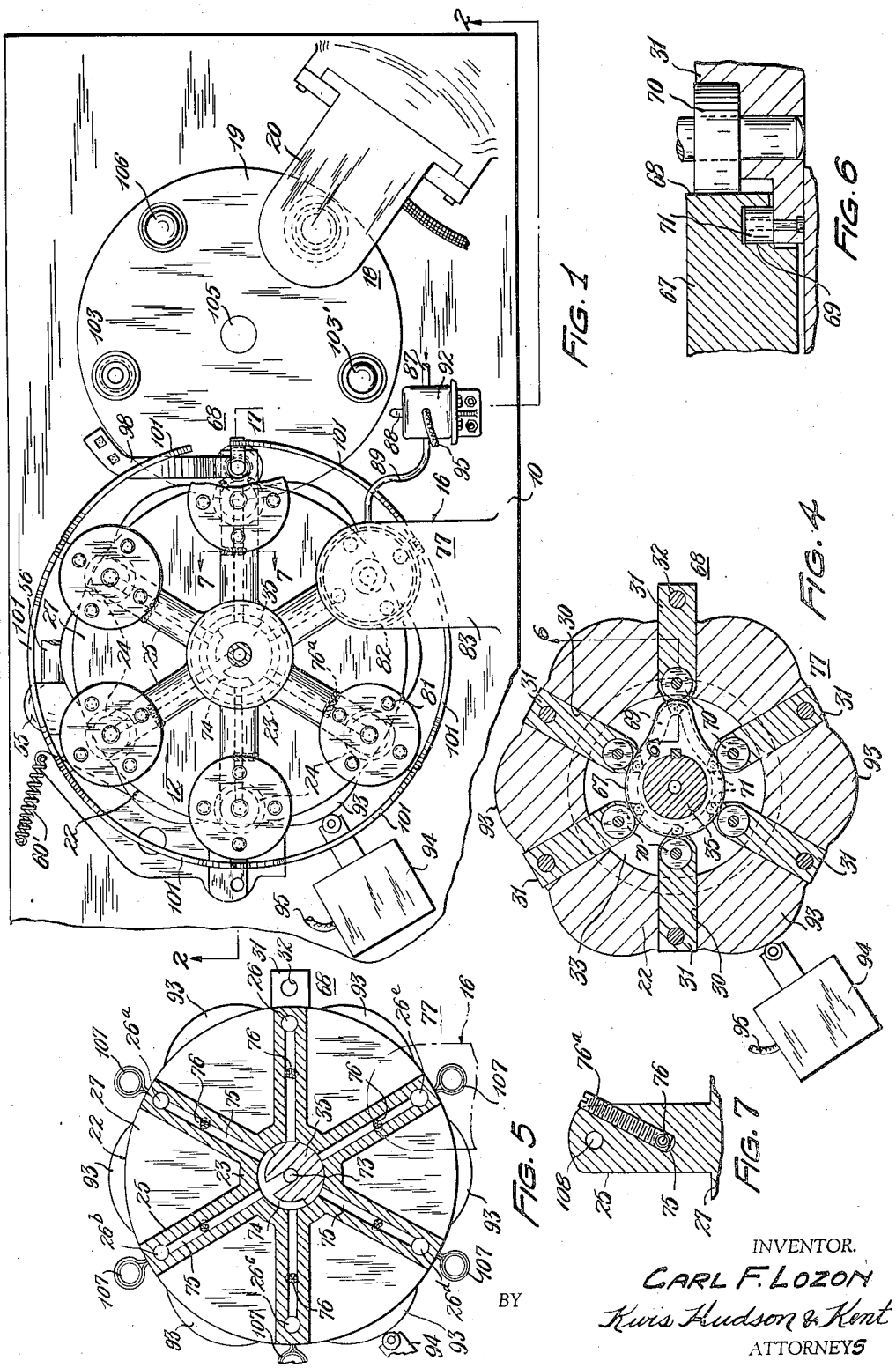
INVENTOR.
CARL F. LOZON
BY Kwis Hudson & Kent
ATTORNEYS May 14, 1940. C. F. LOZON 2,200,577
PRODUCTION OF CHARGED CAPSULES
Filed March 18, 1938 2 Sheets-Sheet 2
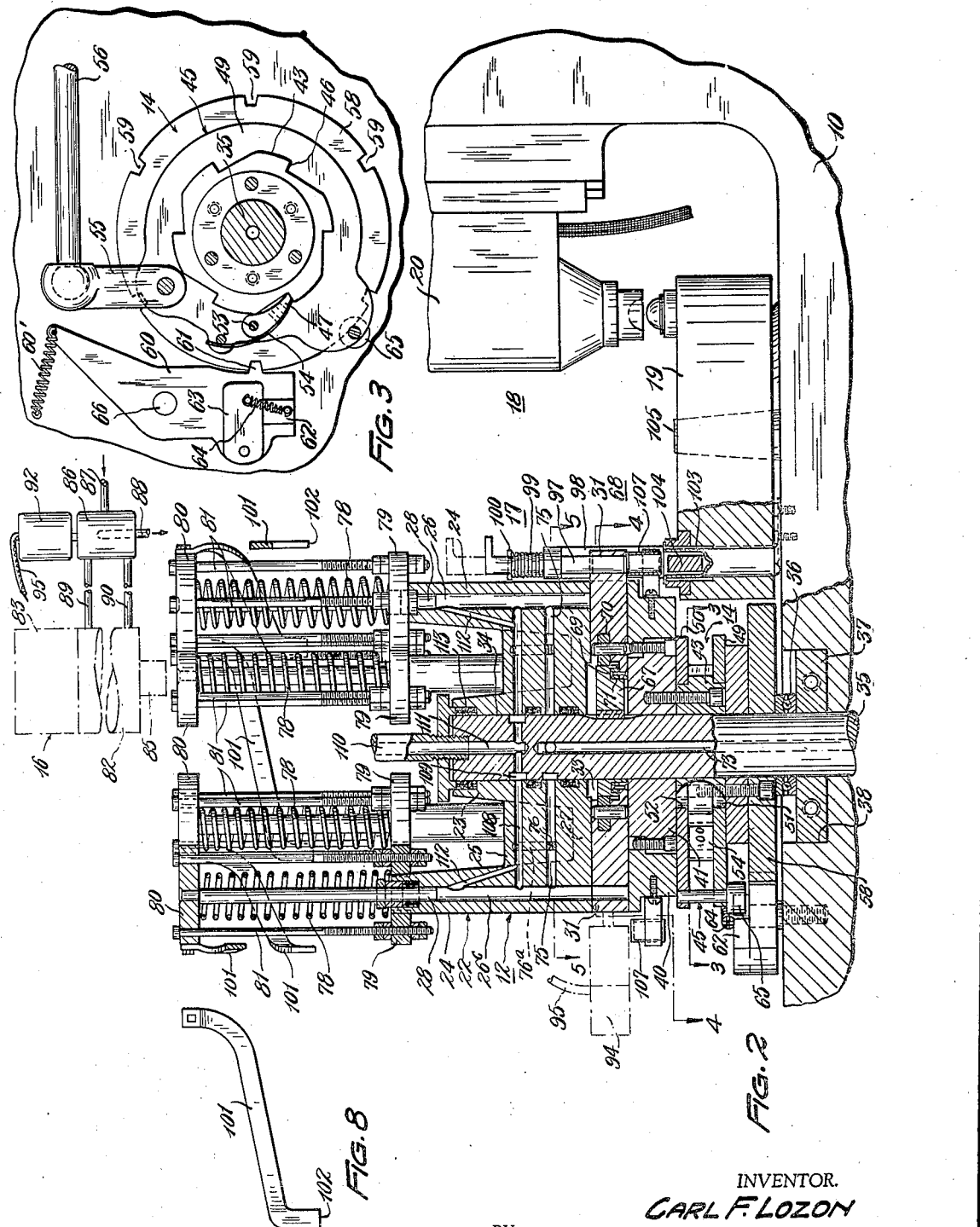
INVENTOR.
CARL F. LOZON
BY Kwis Hudson & Kent
ATTORNEYS Patented May 14, 1940

2,200,577

UNITED STATES PATENT OFFICE 2,200,577

PRODUCTION OF CHARGED CAPSULES

Carl F. Lozon, Massillon, Ohio

Application March 18, 1938, Serial No. 196,720

11 Claims. (Cl. 62—121)

This invention relates to the production of charged capsules such as capsules of the frangible type containing a quantity of carbon dioxide, and, more particularly, to a novel method and apparatus for producing pellets of carbon dioxide in solid form for charging into such capsules.

An object of my invention is to provide a novel method for rapidly and economically producing pellets of solid carbon dioxide, comprising the step of compressing particles of frozen carbon dioxide to a given density and forming the same into a pellet of desired size.

Another object of my invention is to provide a novel method of producing pellets of solid carbon dioxide which comprises applying a predetermined compression load to frozen carbon dioxide and thereby compressing the same to a given density.

A further object of my invention is to provide a novel method for charging capsules with predetermined amounts of carbon dioxide, comprising compressing frozen carbon dioxide for forming a "Dry-Ice" pellet of a given density and size, and then inserting the pellet into a capsule and sealing the same.

Another object of my invention is to provide a novel method of producing Dry-Ice pellets comprising compressing frozen carbon dioxide into a body having a given density and severing a pellet of the desired size from such body.

Still another object of my invention is to provide a novel method of producing Dry-Ice pellets comprising compressing a quantity of frozen carbon dioxide in a die into an elongated body of a given density and severing a pellet of the desired size therefrom leaving a portion of the body remaining in the die, and then compressing an additional quantity of frozen carbon dioxide against the remaining portion to form another such body of the desired density.

A further object of my invention is to provide a novel method of producing Dry-Ice pellets involving the expanding of carbon dioxide in a cylinder to provide a quantity of frozen carbon dioxide therein and then applying a predetermined load to the frozen carbon dioxide to compress the same into a body of a given density.

Still another object of my invention is to provide a continuous method for rapidly and economically producing Dry-Ice pellets involving the expanding of carbon dioxide in a traveling cylinder and compressing the frozen carbon dioxide in the cylinder to a body of a given density, and then servering a pellet from such body and transferring the pellet to a capsule to be charged, such compressing and severing taking place at different points of cylinder travel.

Another object of my invention is to provide novel apparatus for the production of Dry-Ice pellets comprising a cylinder adapted to contain a quantity of frozen carbon dioxide and means for applying a predetermined load to the frozen carbon dioxide for compressing the same into a body of given density.

Still another object of my invention is to provide apparatus, of the type referred to, in which the compressing of the frozen carbon dioxide is accomplished in a die device embodying means for severing a pellet of the desired size from the body of compressed frozen carbon dioxide.

Yet another object of my invention is to provide apparatus, of the type mentioned, having means for expanding carbon dioxide in the die device or cylinder for providing a quantity of frozen carbon dioxide therein.

A further object of my invention is to provide apparatus, of the type referred to, having a plurality of traveling cylinders adapted to contain frozen carbon dioxide and each having a plunger operable therein for compressing the frozen carbon dioxide, and embodying means operable in timed relation to the travel of the cylinders for expanding carbon dioxide to thereby provide a quantity of frozen carbon dioxide in the cylinders.

The invention may be further briefly summarized as consisting in certain novel steps of procedure and combinations and arrangements of parts hereinafter described and particularly set out in the appended claims.

In the accompanying sheets of drawings,

Fig. 1 is a partial top plan view of pellet-forming and capsule-charging apparatus embodying my invention;

Fig. 2 is a vertical sectional view taken through the apparatus substantially as indicated by line 2—2 of Fig. 1;

Fig. 3 is a partial transverse sectional view taken through the dial indexing mechanism on line 3—3 of Fig. 2;

Fig. 4 is a partial transverse sectional view taken through the dial as indicated by line 4—4 of Fig. 2;

Fig. 5 is a transverse sectional view taken through the dial at a higher elevation as indicated by line 5—5 of Fig. 2;

Fig. 6 is a partial vertical sectional view showing operating cams and taken substantially on line 6—6 of Fig. 4;

Fig. 7 is a partial vertical sectional view taken through the dial on line 7—7 of Fig. 1 and showing the expanding orifice; and Fig. 8 is a detached elevational view of one of the ejector actuating arms.

More detailed reference will now be made to the accompanying drawings which illustrate one embodiment of my pellet-forming and capsule-charging machine and show apparatus which may be used in carrying out the method of my invention. It should be understood, however, that my invention may be embodied in various other machines and that my novel method may be carried out by other forms of apparatus than that herein disclosed.

The pellet-forming and capsule-charging apparatus illustrated in this instance comprises a frame 10 which provides a support for the several mechanisms or devices of the apparatus. These devices may include a traveling die device 12, preferably in the form of a rotating dial, in which the pellets are produced; an indexing mechanism 14 for actuating the dial; a stationary power device 16 for applying a predetermined compression load to the frozen carbon dioxide; a pellet-ejecting device 17; and welding apparatus 18 including a rotatable capsule-carrying dial 19 and a welder 20 for sealing the capsules.

The traveling die device 12 may comprise a rotatable circular dial or table 22 having a central hub portion 23 and a plurality of circumferentially spaced upright bodies 24 which are connected with the hub portion by radiating arms or ribs 25 and each of which has a cylinder or bore 26 therein. The lower ends of the bodies 24 and the lower edges of the ribs 25 are connected with a circular laterally extending plate portion 27. Each of the cylinders 26 is provided with an elongated plunger 28 which is reciprocably operable therein. The lower face of the plate portion 27 of the dial may have a plurality of substantially radially extending slots or guideways 30 formed therein in which individual slide members 31 are reciprocably operable. At their inner ends, the guideways connect with a central cam recess or pocket 33 formed in the plate portion 27. Each of these slide members has an opening 32 formed therein adjacent its outer end and which is adapted to form a continuation of the cylinder 26 when brought into registration with the lower end thereof. As will be explained more in detail hereinafter, the plungers 28 operate to compress frozen carbon dioxide in the cylinders 26 and in the openings of the slide members 31, and movement of the slide members causes pellets of compressed frozen carbon dioxide of the desired size to be delivered from the cylinders.

The die device 12 may be operably supported on the frame 10 as by providing a vertical bore 34 in the hub portion 23 of the dial 22 and providing the frame with an upright non-rotatable spindle 35 which extends into the bore and forms a pivot shaft for the die device. The weight of the die device 12 and of various other parts of the apparatus adjacent thereto may be carried by a suitable thrust bearing 36 and thereby transmitted to the frame 10 through the sectional retaining clamp 37 which is mounted on the spindle 35 and seated in a recess 38 of the frame.

Below the slides 31 I provide a ring section 40 which may be an integral part of the dial 22 or, for convenience of manufacture, may be formed as a separate part and bolted to the dial. Portions of this ring section form bearing faces at the bottoms of the radially extending guideways in which the slides 31 operate. A filler block 41 may be connected with the ring section 40 and disposed in the recess thereof surrounding the spindle 35. The ring section may be connected with the plate portion 27 of the dial by suitable means, such as bolts or screws, located between the ribs 25.

For rotating the die device 12 I provide an indexing mechanism 14 which may be located between the ring section 40 and the top of the frame 10. This indexing mechanism includes a ratchet member 43 which may be connected with the dial 22 through the filler block 41 and the ring section 40, and an oscillating pawl device 45 which cooperates with the ratchet member. As shown in Figs. 2 and 3, the ratchet member 43 has a plurality of circumferentially spaced teeth 46 with which a pivoted pawl 47 of the pawl device 45 cooperates. The pawl device 45 may comprise a pair of vertically spaced plate rings 49 and 50 which are journaled respectively on the shouldered portions 51 and 52 of the ratchet member 43 and carry the pawl 47, the latter being disposed between the plate rings and mounted on a pivot pin 53 extending between such plate rings. A suitable spring 54 may be provided to act on the pawl 47 to normally urge the same toward engagement with the teeth of the ratchet member 43.

For causing oscillation of the pawl device 45, I may provide the ring sections 49 and 50 thereof with a laterally projecting arm 55 which may be connected with an eccentric, or other means for producing oscillating movement, by means of the connecting rod or link 56. It will be seen from the arrangement just described for the indexing mechanism 14 that, when the pawl device 45 is oscillated, it will cause step-by-step rotation of the ratchet member 43 on the spindle 35 in a counterclockwise direction as seen in Fig. 3 and a corresponding step-by-step counterclockwise rotation of the die device 12.

For intermittently locking the ratchet member 43 and the die device against reverse rotation I may provide the indexing mechanism 14 with locking means comprising a holding disk 58 having recesses or notches 59 in its outer edge spaced circumferentially to correspond in number and spacing with the cylinders 26, and a latch member 60 pivoted on the frame 10 and having a projection 61 engageable in one of the recesses 59. A tension spring 60' may be connected with an arm of the member 60 to cause such engagement. The latch member 60 may have a stop 62 formed or mounted thereon and a pivoted pawl 63 which is movable away from the stop but normally held in engagement therewith by a tension spring 64. A roller 65 carried by the pawl device 45 is located thereon so that it will engage the pivoted pawl 63 of the latch member 60 during the oscillation of the pawl device.

During the idling movement of the pawl device 45, that is, during its clockwise rotation, the roller 65 moves the pawl 63 away from the stop 62 a sufficient distance to permit the roller to pass the latch member 60 without disengaging the projection 61 from the holding plate 58. On the return oscillation or power stroke of the pawl device 45, the roller 65 engages the pawl 63 and acts through the same on the latch member 60 to swing the latter upon its pivot 66, thereby lifting the projection 61 out of the recess 59 in which it happens to be engaged. The release of the projection 61 from the recess of the holding plate 58 takes place during the first part of the power stroke of the pawl device so that, during the succeeding portion of the power stroke, the pawl 47 will advance the ratchet member 43 and the dial 22 connected therewith. During this power stroke of the pawl device 45, the roller 65 moves past the latch member 60, whereupon the projection 61 is permitted to reengage in the next succeeding recess 59 of the holding plate 58.

It is desirable that the slides 31 be actuated during the rotation of the die device 12, and for this purpose I may provide cam means in the central pocket 33 of the dial 22. This means may comprise a cam 67 for projecting the slides outwardly in succession as the cylinders approach the pellet-ejecting station 68 and a cam track 69 for retracting the slides as the cylinders travel away from the pellet-ejecting station. The slides may be provided with a pair of rollers 70 and 71 adjacent the inner ends thereof, the rollers 70 being in engagement with the cam 67 for projecting the slides and the rollers 71 being in engagement with the cam tracks 69 for retracting the slides. As will be seen from Fig. 4, the contours of the cam 67 and the cam track 69 are such that during the major portion of the rotary travel of the dial the slides are in their retracted position with their openings 32 registering with the cylinders 26 and are projected in succession as the cylinders approach the pellet-ejecting station 68.

The frozen carbon dioxide, which is to be compressed into Dry-Ice in forming the pellets, may be supplied to the cylinders 26 in any suitable way, but I prefer to provide the frozen carbon dioxide by expending carbon dioxide from gas or liquid form, preferably the latter, so that frozen carbon dioxide will be produced and a quantity of the particles of frozen carbon dioxide will be collected in the cylinders. I preferably arrange for the expending of the carbon dioxide during a portion of the travel or advance movement of the cylinders, so that the frozen carbon dioxide will be formed at the desired rate just ahead of the compressing step whereby the production of pellets may be rapidly carried out as a substantially continuous operation. For this purpose I provide the spindle 35 with a supply passage 73 through which the carbon dioxide may be supplied under pressure. The passage 73 leads to an arcuately extending groove 74 with which radially extending passages 75 of the dial connect during rotation of the die device 12. The radial passages 75 communiciate at their outer ends with the respective cylinders 26 and adjacent such connection each passage is provided with a suitable expanding orifice 76. Any suitable expending orifice or means may be provided at this location, such as the screw 76a shown in this instance, in which the orifice is formed. The arcuate groove 74 preferably extends through an angular distance such that two or three of the passages 75 will always be in communication therewith and thus the carbon dioxide under pressure may be supplied to each of the orifices 76 while the corresponding cylinder 26 travels through an angular distance of approximately 180°. As the carbon dioxide discharges through the orifice 76, it is rapidly expanded and the sudden cooling which accompanies such rapid expansion causes some or all of the carbon dioxide to be frozen and results in the collection of a quantity of particles of frozen carbon dioxide or snow in the outer end of the passages 75 and in the cylinders 26.

For convenience in tracing the cycle of operation, attention is directed to Fig. 5 in which the cylinders 26a, 26b, and 26c are in communication with the supply groove 74 and are being filled or partially filled with frozen carbon dioxide by reason of the expansion taking place through the orificies 76. The cylinder 26d has traveled past the expanding area and the inner end of its passage 75 has been cut off from the supply groove 74. The cylinder 26e is shown at the compressing station 77, that is to say, at a point beneath the power device 16 where the frozen carbon dioxide is compressed. The cylinder 26 is at the pellet-ejecting or delivery station 68 at which point of travel of the dial the slide 31 is projected laterally so that the pellet may be ejected therefrom by the ejecting means 17.

As mentioned above, each of the cylinders 26 is provided with a plunger 28 which operates in the cylinder to compress the frozen carbon dioxide therein. Each of the cylinders also carries a plunger retracting device comprising a helical compression spring 78 disposed around the plunger and a pair of stationary and movable spring plates 79 and 80. The outer end of the plunger 28 is connected with the movable spring plate 80 and a plurality of guide rods 81 mounted on the stationary spring plate 79 extend through openings of the movable plate 80 and guide the movements of the latter.

The power device 16 is located at the compressing station 77 and may comprise a compressed air cylinder 82 which is mounted on a bracket or the like, 83 extending above the frame 10. The cylinder 82 may be a double acting cylinder having a piston operable therein and a thrust member 85 connected with the piston and projecting from the cylinder substantially on the axis of the compressing station and of the cylinder 26e. A suitable valve device 86 controls the operation of the cylinder 82 and has a compressed air supply pipe 87 and an exhause pipe 88 connected therewith. Pipes 89 and 90 connect the valve device 86 with the upper and lower ends of the cylinder 82 for supplying and exhausting the motive fluid in timed relation to cause the desired power or retracting strokes of the piston.

For actuating the valve 86 so that the power device 16 will make a power stroke each time that one of the cylinders 26 arrives at the compressing station 77, I provide a valve actuating magnet 92 which is energized intermittently in timed relation to the advance movements of the dial 22. For energizing the magnet at the proper time intervals, I may provide the dial 22 with a plurality of circumferentially spaced cam projections 93 and arrange a control switch 94 adjacent the dial to be actuated by such cam projections. The switch 94 may be connected with the magnet 92 and a source of electric current by a suitable conductor 95.

As each of the cylinders 26 arrives at the compressing station 77, the switch 94 is actuated to cause the magnet 92 to operate the valve 86 whereby pressure fluid is supplied to the cylinder 82 to cause a downward power stroke of the thrust member 85. This thrust member engages the spring plate 80 of the plunger 28 which happens to be at the compressing station, whereby the plunger is forced downwardly in its cylinder to compress the frozen carbon dioxide particles therein. At the time that the compression stroke of the plunger 28 takes place, the corresponding slide 31 is in its retracted position and the opening 32 of the slide is then in register with the lower end of the cylinder, so that the frozen carbon dioxide will be forced into and substantially fill the opening of the slide.

The area of the cylinder 82 and the pressure of the motive fluid supplied by the pipe 87 are preferably such that a predetermined compression load will be supplied to each of the plungers 28 when they arrive at the compressing station. This compression load is of a value such that the plunger 28 will compress the frozen carbon dioxide to a given density and will thereby form an elongated body of substantially solid Dry-Ice in the cylinder 26, with the lower portion of such body extending into and filling the opening 32 of the corresponding slide.

As each cylinder 26 arrives at the ejecting station 68, the slide 31 is projected radially, whereby the portion of the body of Dry-Ice which extends into the opening of the slide is sheared off to provide a pellet of corresponding size. The openings of the slides 31 are formed of the size and shape that the pellets are to have, and since the pellets are formed of carbon dioxide compressed to a given density, each pellet will contain a desired quantity or volume of carbon dioxide.

When such outward movement of the slide 31 takes place to shear the pellet from the compressed body, a portion of this body remains in the lower end of the cylinder 26 and when this cylinder travels through the expanding section, additional frozen carbon dioxide is formed in the cylinder above the remaining portion of the body. When the cylinder again arrives at the compressing station, the additional frozen carbon dioxide is compressed against the remaining body portion and unites therewith to form another substantially homogeneous body of Dry-Ice of a given density from which a pellet will be sheared at the next station.

As will be seen from Figs. 2 and 4 of the drawings, the outward movement of the slide 31 carries the opening 32 thereof to a point outside the cylinder 26 whereupon an ejecting plunger 97 may be moved downwardly to eject the pellet from the slide. This plunger may be mounted in any suitable manner. For example, it may be operatively supported by a bracket 98 extending above the frame 10. A compression spring 99 may be disposed between the upper end of the bracket and a pin 100 for retracting the plunger from the opening of the slide. The ejecting plunger 97 may be actuated in any suitable manner. For example, I may provide an arcuately extending arm 101 on each of the movable spring plates 80. The arm 101 is so formed that the outer end 102 thereof will engage the upper end of the ejecting plunger 97 when the power device 16 causes a downward stroke of the plunger 28 which is then at the adjacent compressing station 77.

The pellets which are discharged in succession from the slides 31 of the rotating die device 12 are preferably transferred to the capsules as fast as they are produced. For accomplishing this purpose, I may arrange the rotatable capsule dial 19 adjacent the die device 12 so that the capsule sections 103 may be moved in succession into position beneath the ejecting plunger 97 to receive the pellets from the slides 31. In Fig. 2 I show a pellet 104 in the capsule section 103 immediately after having been ejected from the slide 31 by the plunger 97. The dial 19 may be mounted on a spindle 105 and may be actuated by suitable means, such as an indexing means similar to that provided for actuating the die device 12, so that it will also rotate in a counterclockwise direction with a step-by-step movement and will carry the capsule sections 103 containing pellets from the station 68 to a welding station beneath the welding head 20. Immediately after the capsule section 103 leaves the station 68, a cover section 103' is applied, and when the capsule arrives at the welding station, the sections are electrically welded together to seal the carbon dioxide charge therein. As the dial 19 rotates, the sealed capsules 106 may be removed and replaced by capsule sections 103 to be advanced to the pellet-ejecting station 68.

It may be desirable to provide the rotating dial 22 with circumferentially spaced guide sleeves 107 which are located adjacent the slides 31. As the dial 22 rotates, the sleeves 107 arrive in succession at a point over the capsule sections 103 when the latter are at the ejecting station 68. When the pellet is ejected from the slide 31 at the station 68 it passes through the sleeve 107 into the capsule section 103. The sleeves 107 serve to guide the pellets into the capsules and also to protect the pellets to some extent from contact with the surrounding atmosphere.

To secure economy of operation it may be desirable to recover the free carbon dioxide gas or vapor which remains or which separates from the frozen carbon dioxide after the expanding operation. For this purpose I provide the dial 22 with a plurality of radial passages 108 which connect the cylinders 26 with an annular groove 109 at the hub of the dial. A pipe 110 is connected with the ring groove 109 through a central passage 111 of the spindle 35 and leads to a gasometer or other chamber in which the carbon dioxide gas or vapor may be collected for storage or recompression. If desired, the radial passages 108 of the dial may have branch passages 112 which connect with the respective cylinders 26 adjacent their extreme upper ends. The leakage of carbon dioxide around the spindle 35 may be reduced to a minimum by providing suitable packings 113 between the spindle and the dial 22.

From the foregoing description and the accompanying drawings it will now be readily understood that I have provided a novel method and apparatus for the production of carbon dioxide pellets and the charging of capsules with carbon dioxide. It will be seen, furthermore, that my novel method and apparatus provide for the rapid and economical production of pellets of a desired size and density whereby the proper amount of carbon dioxide can be supplied to the capsules with accuracy and facility.

While I have illustrated and described my novel method and apparatus in detail, it should be understood that I do not wish to be limited to the precise steps of procedure and arrangements of parts herein disclosed, but regard my invention as including such changes and modifications as do not constitute a departure from the spirit of the invention and the scope of the appended claims.

Having thus described my invention, I claim:

1. The method of charging capsules with carbon dioxide, which comprises forcing frozen carbon dioxide into a hollow die and thereby forming an elongated body of Dry-Ice of a desired cross-sectional area and a desired density, severing a desired length from said body to provide a given quantity of carbon dioxide and leaving a portion of said body in the die, forcing additional frozen carbon dioxide into the die to unite with the remaining portion of said body and form another such elongated body of dry ice, severing a desired length from the last mentioned body, inserting the severed lengths into capsules, and sealing the capsules.

2. In a method of charging capsules with carbon dioxide, the steps of compressing frozen carbon dioxide in a die chamber to thereby form a body of Dry-Ice of desired density, and severing a section of predetermined size from said body and in the same operation transferring the severed section to the capsule to be charged.

3. In apparatus of the character described, a cylinder adapted to receive a quantity of frozen carbon dioxide, a member having an opening therein and movable to shift such opening into and out of communication with said cylinder, a plunger operable in said cylinder and adapted to force frozen carbon dioxide into the opening of said member, means for actuating said movable member, and means for applying a predetermined load to said plunger for compressing the frozen carbon dioxide to a given density.

4. In apparatus of the character described, a cylinder adapted to receive a quantity of frozen carbon dioxide, a member having an opening therein and movable transversely to the cylinder for shifting such opening from a position in communication with the cylinder to a position outside the cylinder, a plunger operable in said cylinder, means for applying a predetermined load to said plunger for compressing the frozen carbon dioxide into a body of given density with a section of such body filling the opening of said member, and means for actuating said member to cause shearing cooperation between the same and said cylinder to thereby sever the section from said body and transport the severed section to a point outside the cylinder.

5. In apparatus of the character described, a traveling cylinder, means operable during a portion of the travel of the cylinder for expanding carbon dioxide to provide a quantity of frozen carbon dioxide therein, a plunger operable in said cylinder, and means adapted to be operated at another portion of cylinder travel for applying a predetermined load to the plunger for compressing the frozen carbon dioxide to a given density.

6. In apparatus of the character described, a rotatable dial having circumferentially spaced cylinders thereon, a plunger in each cylinder, means for causing carbon dioxide to be expanded in each cylinder during a portion of its travel for providing a quantity of frozen carbon dioxide therein, means operable to apply a predetermined load to the pistons in succession for compressing the frozen carbon dioxide to a given density, and means for discharging pellets of the compressed frozen carbon dioxide from said cylinders in succession.

7. In apparatus of the character described, a rotatable dial having circumferentially spaced cylinders thereon, means for rotating said dial, means for supplying frozen carbon dioxide to the cylinders in succession, means operable to apply a predetermined load to the carbon dioxide of the cylinders in succession for compressing the same to a given density, and means for discharging pellets of the compressed frozen carbon dioxide from said cylinders in succession.

8. In apparatus of the character described, a rotatable dial having circumferentially spaced cylinders thereon, a plunger in each cylinder, means for supplying frozen carbon dioxide to the cylinders, means for rotating the dial to cause the cylinders to travel past a charging station, a compressing station and an ejecting station in succession, means operable to provide a supply of frozen carbon dioxide in the cylinders upon their passing the charging station, power means at the compressing station adapted to act on the plungers of the cylinders in succession for compressing the frozen carbon dioxide, and means for discharging pellets of the compressed frozen carbon dioxide from said cylinders in succession as they travel past the ejecting station.

9. In apparatus of the character described, a rotatable dial having circumferentially spaced cylinders thereon, a plunger in each cylinder, means for supplying frozen carbon dioxide to the cylinders in succession, a slide for each cylinder and movable transversely to the axis thereof, each slide having a measuring chamber adapted to form a continuation of its corresponding cylinder when the slide is in a retracted position, means for compressing the frozen carbon dioxide in the cylinders and the measuring chambers of the corresponding slides in succession, means for actuating the slides during rotation of the dial for shifting the measuring chamber from a cylinder-registering position to a position outside the cylinder, and means for ejecting compressed frozen carbon dioxide from the measuring chambers of the slides.

10. In apparatus of the character described, a rotatable dial having circumferentially spaced cylinders thereon, means for rotating said dial, means for supplying frozen carbon dioxide to the cylinders in succession, means operable to apply a predetermined load to the carbon dioxide of the cylinders in succession for compressing the same to a given density, means for discharging pellets of the compressed frozen carbon dioxide from said cylinders in succession substantially at a predetermined point of cylinder travel, and a second rotatable dial adapted to carry container sections and operable to bring the same to said predetermined point in succession to receive the pellets.

11. In apparatus of the character described, a rotatable dial having circumferentially spaced cylinders thereon, a plunger in each cylinder, means for supplying frozen carbon dioxide to the cylinders in succession, a slide for each cylinder and movable transversely to the axis thereof, each slide having a measuring chamber adapted to form a continuation of its corresponding cylinder when the slide is in a retracted position, means for compressing the frozen carbon dioxide in the cylinders and the measuring chambers of the corresponding slides in succession, means for actuating the slides during rotation of the dial for shifting the measuring chamber from a cylinder-registering position to a position outside the cylinder, means for ejecting compressed frozen carbon dioxide from the measuring chambers of the slides, and a second rotatable dial adapted to carry container sections and to advance the same in succession to a position to receive the bodies of compressed frozen carbon dioxide from said slides.

CARL F. LOZON.